April 13, 1926.
R. E. HAMMOCK
INSECT EXTERMINATING APPARATUS
Filed April 19, 1924
1,580,297
4 Sheets-Sheet 4
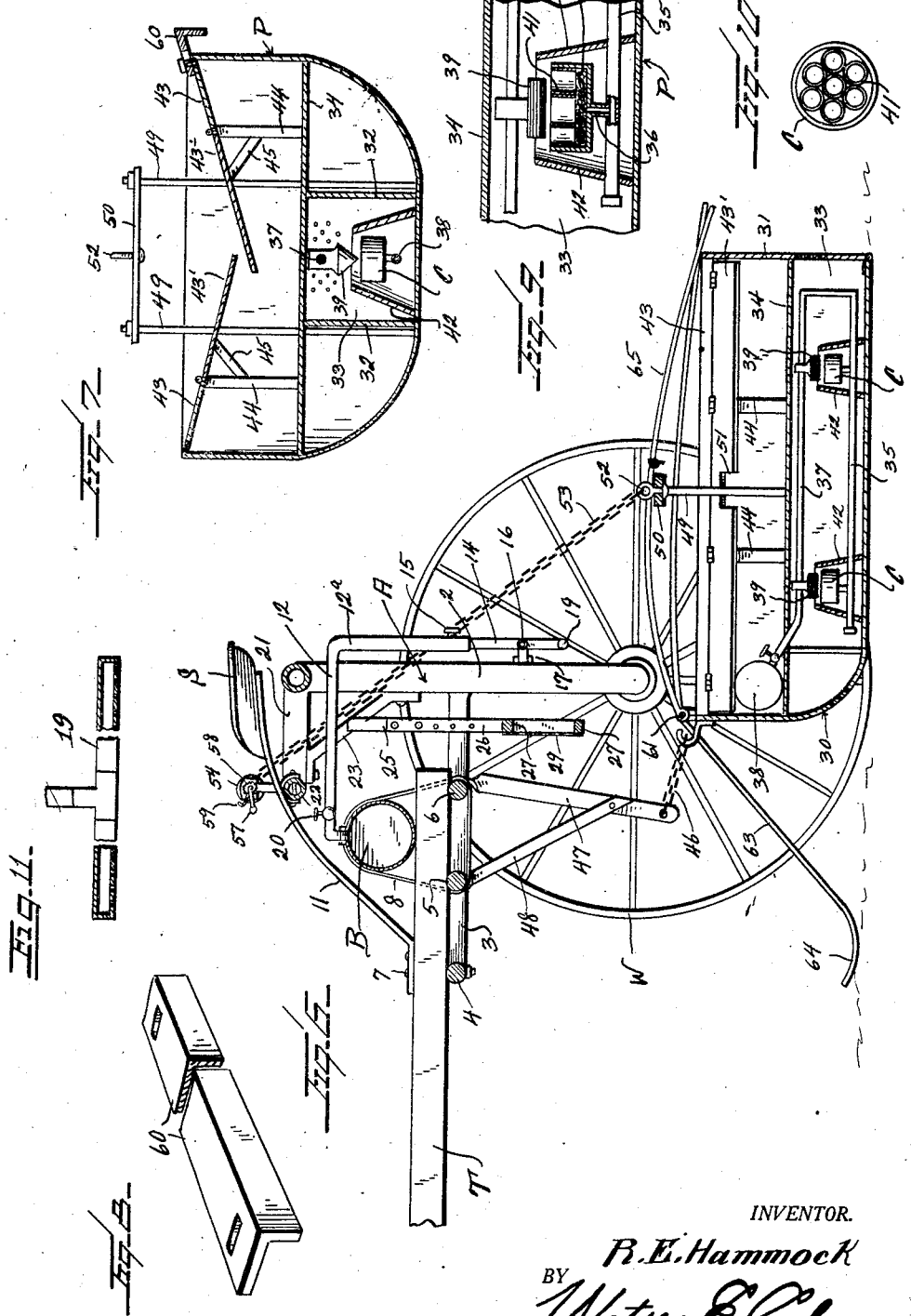
INVENTOR.
R. E. Hammock
BY Watson E. Coleman
ATTORNEY.

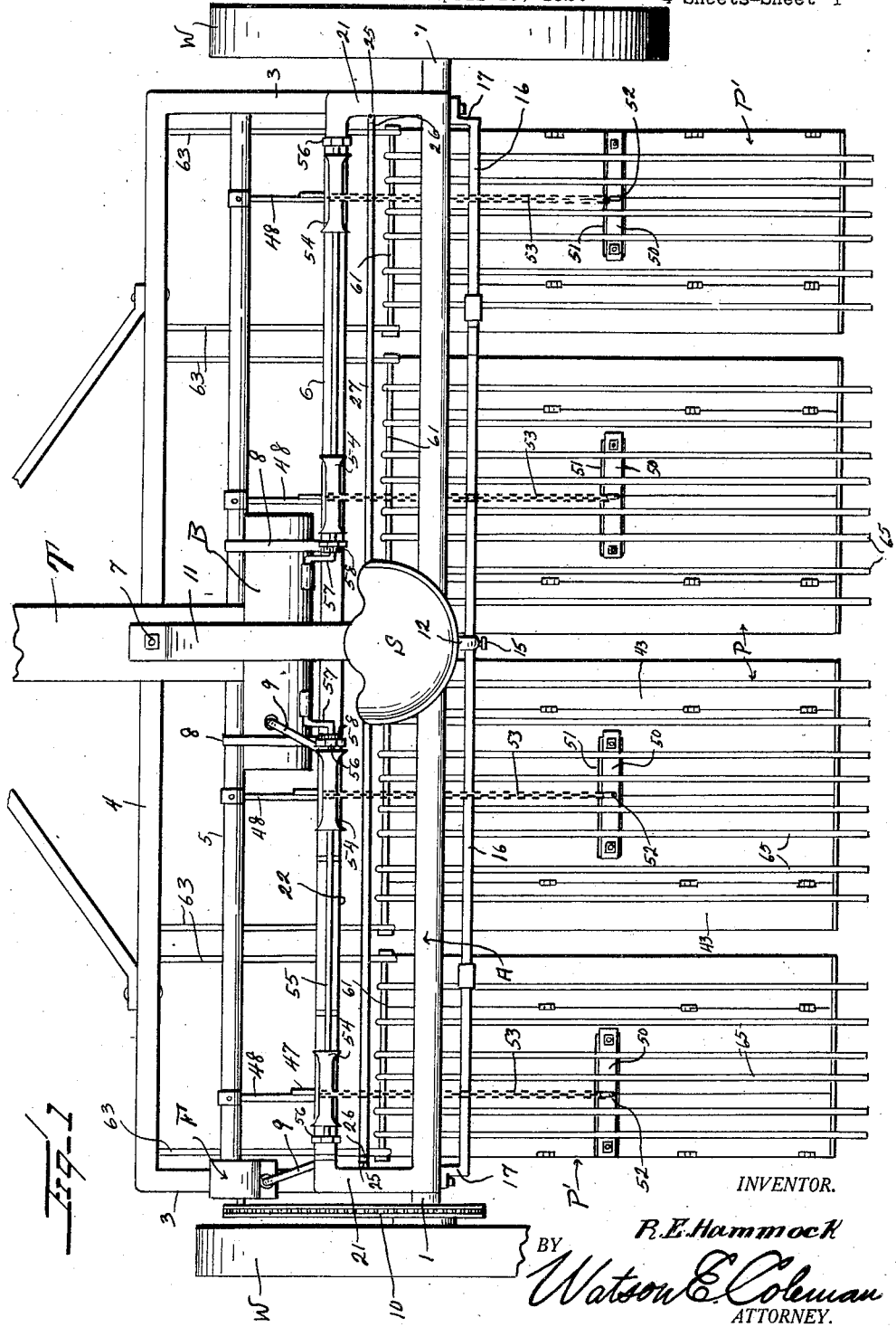

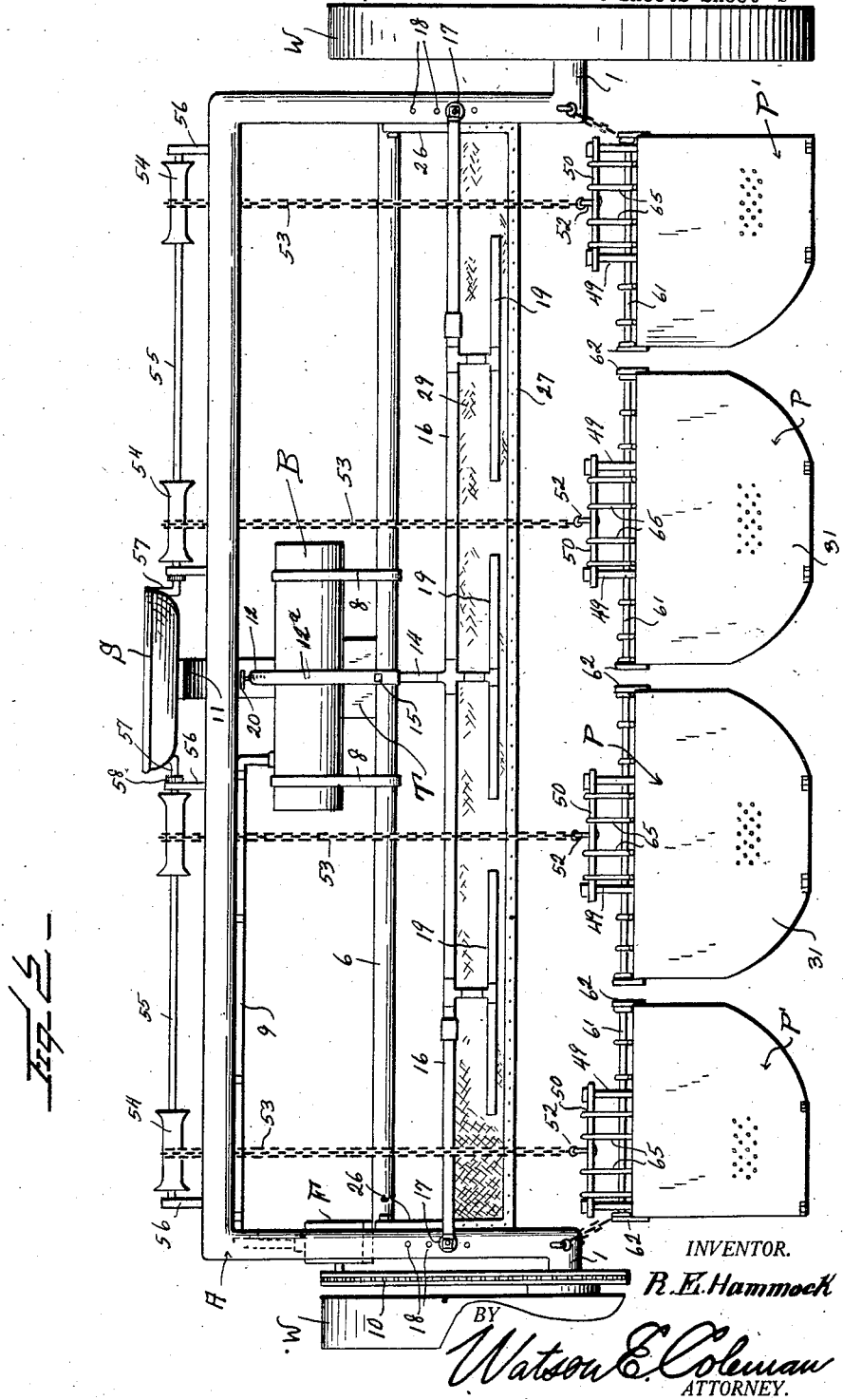

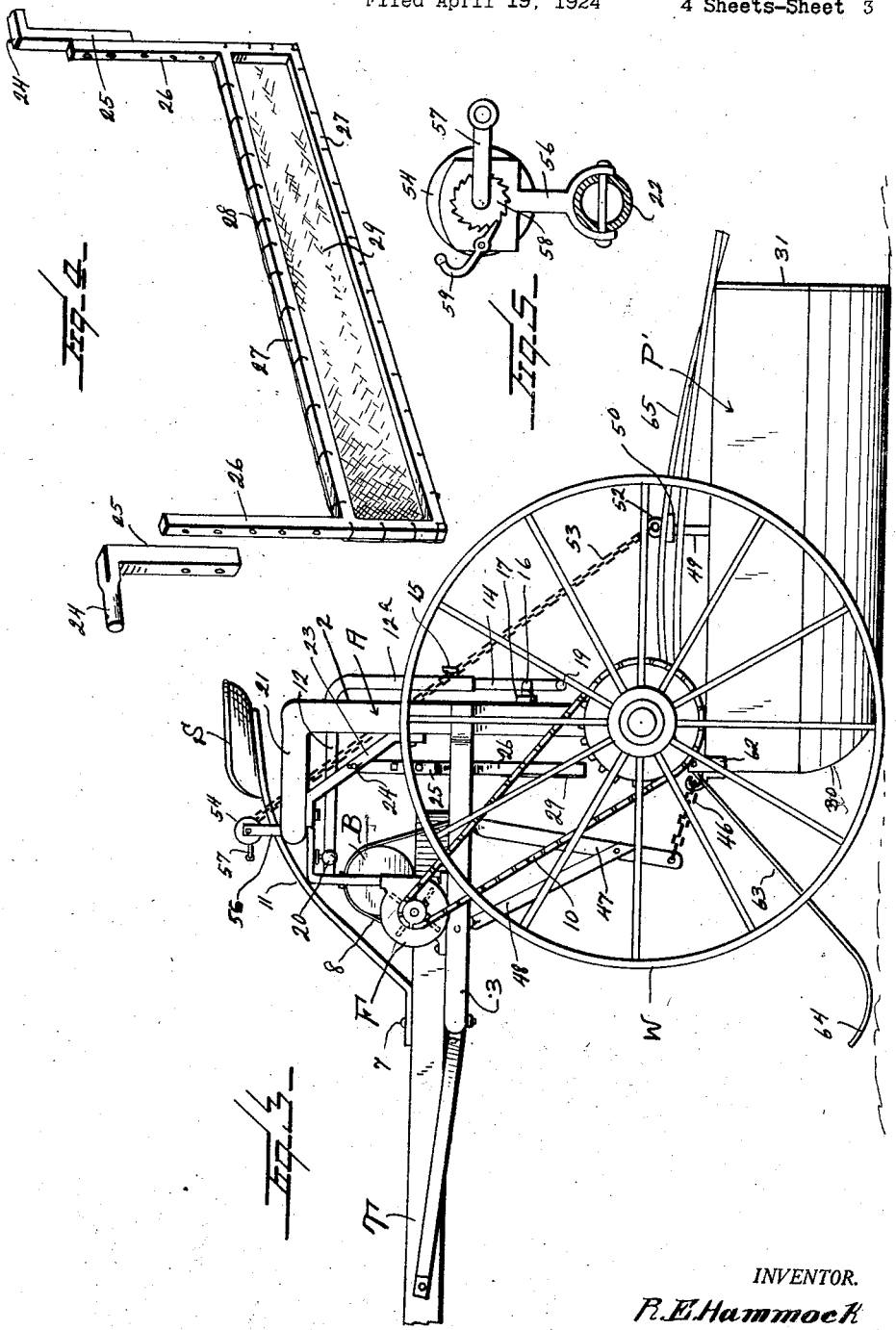

Patented Apr. 13, 1926.

1,580,297

UNITED STATES PATENT OFFICE.

ROBERT E. HAMMOCK, OF DUNKLIN COUNTY, MISSOURI, ASSIGNOR OF ONE-HALF TO B. FRANK HIGHFILL, OF HORNERSVILLE, MISSOURI.

INSECT-EXTERMINATING APPARATUS.

Application filed April 19, 1924. Serial No. 707,686.

*To all whom it may concern:*

Be it known that I, ROBERT E. HAMMOCK, a citizen of the United States, residing in Dunklin County, State of Missouri, have invented certain new and useful Improvements in Insect-Exterminating Apparatus, of which the following is a specification, reference being had to the accompanying drawings.

This invention relates to certain improvements in insect exterminating apparatus and it is primarily an object of the invention to provide novel and improved means whereby the destruction of the insect is effected by cremation.

The invention also has for an object to provide a novel and improved apparatus of this character especially designed and adapted for destroying boll weevils and other insects that infest cotton and wherein the insects dislodged from the plants are collected in a pan or pans serving as an incinerating medium.

It is also an object of the invention to provide a novel and improved apparatus of this general character comprising a portable structure and pans operatively engaged with such structure for travel between plant rows together with means for dislodging the insects from the plants and for destroying such insects collected within the pans.

An additional object of the invention is to provide a novel and improved apparatus of this general character embodying pneumatic means for dislodging the insects from the plants together with an agitating member carried by the structure for direct contact with the upper portions of the plants to effect a further agitation thereof to dislodge the insects thereon.

Another object of the invention is to provide a novel and improved device of this general character comprising a portable structure together with pans operatively engaged therewith and positioned to travel between adjacent plant rows together with means for raising said pans to an inoperative position when the apparatus is not in use or to facilitate a turn at the end of a plant row.

The invention consists in the details of construction and in the combination and arrangement of the several parts of my improved insect exterminating apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan illustrating an apparatus constructed in accordance with an embodiment of my invention;

Figure 2 is a view in rear elevation of the structure as illustrated in Figure 1;

Figure 3 is a view in side elevation of the structure as illustrated in Figure 1;

Figure 4 is a view in perspective of the member herein employed for agitating the upper portion or foliage within a plant row;

Figure 5 is a fragmentary view partly in elevation and partly in section of the means for raising and lowering the pans;

Figure 6 is a vertical sectional view taken substantially through the longitudinal center of the machine as illustrated in Figure 1;

Figure 7 is an enlarged transverse sectional view taken through one of the pans as herein employed;

Figure 8 is a fragmentary view in perspective of a side apron for coaction with a pan;

Figure 9 is a fragmentary longitudinal sectional view taken through a pan as herein disclosed;

Figure 10 is a view in top plan of a burner; and Figure 11 is an enlarged fragmentary view partly in elevation and partly in section of one of the spraying members or nozzles.

As disclosed in the accompanying drawings, A denotes an arched axle of desired dimensions but preferably of a length to straddle three plant rows, the opposite ends of the axle being provided with the outstanding spindles 1 upon which are mounted the supporting wheels W.

The vertical side members 2 at a predetermined point above the spindles 1 are provided with the forwardly directed arms 3 connected at their outer ends by the cross member 4 and intermediate their ends by the spaced cross members 5 and 6. Resting upon the central portions of the members 4, 5 and 6 is the inner end portion of a draft tongue T, said tongue being bolted, as at 7, to the forward member 4.

Resting upon the rear portion of the tongue T is a tank B held in applied position by the straps 8 disposed over the tank B and under the members 5 and 6 at opposite sides of the tongue.

Supported by one of the arms 3 is a fan or air compressor F, preferably of a rotary type and which is in communication with the tank B through the pipe 9. The fan or compressor F, as herein disclosed, is operatively engaged with one of the wheels W by the chain 10 so that when the apparatus is in transit, air under pressure may be stored within the tank B and said supply being substantially maintained during the period the air is being exhausted from said tank.

A seat S is positioned substantially above the axle A and is carried by the spring 11 suitably anchored to the tongue T.

In communication with the tank B is a rearwardly disposed pipe 12 terminating in a depending portion 12$^a$ and with which depending portion is telescopically engaged a vertically disposed pipe 14, said pipe 14 and portion 12$^a$ being maintained against relative movement in a well-known manner by the holding bolt 15. The lower end portion of the pipe 14 is in communication with a manifold pipe 16 extending transversely of the apparatus with its opposite ends closed, said closed ends being continued by the offset extensions 17 adapted to be adjustably connected, as at 18, with the side members 2 of the axle A. The manifold pipe 16 is adapted to be raised or lowered in accordance with the heighth of the plant rows being treated and the adjustable connection of the extensions 17 with the side members 2 of the axle A permits said manifold pipe to be effectively maintained in desired adjusted position. The manifold pipe 16 is further maintained in its required working position by the holding bolt 15.

The apparatus, as herein disclosed, is of a type particularly designed for simultaneous treatment of three plant rows and depending from the manifold pipe 16 are the spraying members or nozzles 19 adapted to be positioned substantially directly above the plant rows so that the air discharged therethrough from the tank B will strike the plants from above, the air blast serving to dislodge boll weevils or other insects from the plants.

The pipe 12 has interposed therein a valve 20 of any desired type whereby the discharge of air from the tank B may be readily regulated or controlled.

The side members 2 of the axle A at their upper ends are provided with relatively short forwardly directed arms 21 having their outer ends connected by the transversely disposed member 22. Interposed between each of the arms 21 and the adjacent member 2 is a diagonally disposed bracing bracket or member 23. Pivotally engaged with each of the brackets or members 23 and disposed therethrough is a spindle 24 provided at its inner end with a depending arm 25 adapted to be adjustably connected with the upper end portions of the elongated arms 26. The lower portions of the arms 26 are tied or connected by the spaced parallel members 27 and to said members 27 and the portions of the arms 26 between said members are secured, as at 28, the marginal portions of the flexible strip 29 preferably canvas. As the apparatus passes over the plant rows this flexible member or canvas 27 together with the parts associated therewith constitutes an agitating means adapted to have direct contact with the upper portions of the plants to provide additional means for effectively agitating such plants and dislodging therefrom the insects thereon. The adjustable conection between the arms 25 and 26 permits the agitating member to be positioned or arranged as the occasions of practice may best require.

In practice, the wheels W are adapted to each travel between adjacent plant rows with, as hereinbefore stated, three rows between said wheels W. Travelling between adjacent rows arranged between the wheels are the pans P and between the outer of said rows and the wheels W are the pans P′.

The pans P and P′ travel on the ground and are of sufficient weight to crush the bolls or squares or other insects which may drop to upon the ground ahead of the pans. Each of the pans P is of desired length and of a width to substantially bridge the space between adjacent plant rows. The forward end portions of each of the pans P is rounded from below, as indicated at 30, and the opposite or rear end constitutes a door 31 to permit access within the pan and particularly when desired to remove a burner or to clean out the pan.

Arranged within the pan are the transversely spaced and longitudinally disposed partitions 32 providing a central compartment 33 in which the burners C are adapted to be positioned. The top of the compartment 33 is closed by a horizontally disposed supplemental floor 34 of a length coextensive with the length of the pan P and bridging the space between the side walls thereof as is particularly illustrated in Figures 6 and 7 of the accompanying drawings. Each of the burners C comprises a cup like member having its upper end open and which is in communication with a supply pipe 35 through the medium of the depending nipple 36, said nipple coacting with the pipe to support the burner in applied position. The pipe 35 extends along the lower portion of the compartment 33 and is common to all of the burners C arranged within said compartment. Furthermore, the pipe 35 is continued by a return pipe 37 arranged in the upper portion of the compartment 33 and overlying the burners C and leading to a supply tank 38 herein disclosed as arranged in the forward end portion of the pan P above the supplemental floor 34. Carried by and depending from the return pipe 37 and positioned above each of the burners C is a spreader 39. The portion of the spreader directly above the burner being web-shaped in cross section.

The bottom portion of each of the burners C is provided with a packing 40 of asbestos paper. Fitting within the upper portion of the burner and resting upon said packing or paper 40 is a plurality of flues 41, adjacent flues being preferably connected one to the other. The packing or paper is saturated by the fuel, which is preferably kerosene, and when the burner is ignited the flames are emitted from the flues 41, and through the instrumentality of the associated spreader 39 the flames are caused to contact with the floor 34 over a relatively large area whereby said floor 34 is heated a degree sufficient to effect the desired cremation of the weevils or the like received thereon.

Surrounding each of the burners C is a shell 42 herein disclosed as in the form of a truncated cone. The shell 42 seats directly on the bottom proper of the pan P and the pipe 35 is disposed through the lower portion of said shell.

Disposed along the upper marginal portion of each of the side walls of the pan P is an apron 43 having its lower portion supported by the upstanding posts 44 carried by the supplemental floor 34.

Hingedly connected with the lower marginal portion of the apron 43 is a supplemental apron 43′ normally in continuation of the apron 43. The downward swinging movement of the apron 43 being limited by the arm 45 for contact with each of the posts 44.

As is particularly illustrated in Figure 7, the lower marginal portion of one of the supplemental aprons 43′ terminates inwardly of and above the lower marginal portion of the second supplemental apron 43′. As the boll weevils or other insects are dislodged from the plants they drop upon the aprons 43 and 43′ and slide downwardly thereon and upon the floor 34 and are thus cremated as said floor 34 is maintained by the burner C substantially red hot. The supplemental aprons 43′ may be readily thrown upward outwardly into inoperative position when it is desired to have access within the pan.

The outer pans P′ are constructed somewhat similar to the pans P although substantially one-half the width. The forward portion of each of the pans P′ has each connected therewith a chain or flexible member 46 secured to an arm 47 herein disclosed as depending from the cross member 6 and with which is associated a brace member 48 interposed between the cross member 5 and the lower portion of the arm 47. The central portion of the floor 34 is provided with a pair of upstanding and transversely spaced posts 49 terminating above the top of the pan P or P′ and the upper end portions of said posts 49 are connected by the cross member 50. The inner marginal portion of each of the aprons 43′ is provided with an open slot or recess 51 to avoid the hinderance or obstruction which would otherwise be offered to such apron by the adjacent post 49.

Operatively connected, as at 52, to the central part of the cross member 50 is a flexible member 53 which extends upwardly and is adapted to be wound about a pulley 54 carried by a shaft 55. The shaft 55 is rotatably supported by the upstanding bearings 56 carried by the member 22 and provided at its inner end with an operative crank 57. The crank 57 is positioned in close proximity to the seat S so that requisite rotation may be imparted to the shaft 55 as desired by the occupant of the seat. The inner end portion of the shaft 55 has fixed thereto a ratchet wheel 58 with which engages a pawl 59 carried by the adjacent bearing 56 to normally hold the shaft against rotation in one direction whereby the pans P and P′ are maintained elevated as desired. In order to lower the pans P or P′ it is only necessary to disengage the pawls 59 from the ratchets 58 whereupon said pans will drop by gravity.

Each pair of adjacent pans P and P′ is operatively engaged with a separate shaft 55 so that each of said pairs of pans P and P′ may be raised or lowered independently of the second pair.

The upper marginal portions of each of the aprons 43 is adapted to have adjustably connected therewith an outstanding side apron 60 adapted to be selectively positioned to compensate for the different spacings between the plant rows. The forward end wall of each of the pans P and P′ has positioned thereabove a cross rod 61 having its opposite end portions supported by the upstanding brackets 62 carried by the side walls of the pan P or P′. Hingedly connected with said rod 61 are the elongated fingers 63 adapted to extend downwardly and forwardly with respect to the pan P or P′ and to ride upon the ground in advance of such pan. The end portion of each of the fingers contacting with the ground being rounded, as indicated at 64. These fingers 63 are adapted to pass under foliage which may have fallen to the ground and lift the same upwardly so that the pan P or P′ may readily pass thereunder to receive boll weevils or the like which may be dislodged therefrom.

Also pivotally engaged with the rod 61 are the fingers 65. These fingers are of a length to extend rearwardly of the pan P or P' over the top thereof and terminating rearwardly of the pan. As herein disclosed, these fingers 65 are arranged on a suitable curvature and provide a guard whereby the foliage of the plants under which the pan is passing is prevented from coming into direct contact with the heated pan.

From the foregoing description it is thought to be obvious that an insect exterminating apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An insect exterminating apparatus comprising a portable body, a pan adapted to transverse the surface upon which the portable body rides, means for hitching the pan to the body, incinerating means within the pan, and pneumatic plant agitating means carried by the body, said agitating means being adapted to direct a stream of air in a downward direction toward said pan.

2. An insect exterminating apparatus comprising a portable body, a pan adapted to traverse the surface upon which the portable body rides, means for hitching the pan to the body, incinerating means within the pan, and adjustable pneumatic plant agitating means carried by the body, said adjustable agitating means being adapted to direct a stream of air in a downward direction toward said pan.

3. An insect exterminating apparatus comprising a portable body, a pan adapted to traverse the surface upon which the portable body rides, means for hitching the pan to the body, incinerating means within the pan, a cross member pivotally connected to said portable body, said cross member extending throughout the operating width of said exterminating apparatus and providing a plant agitating means.

4. An insect exterminating apparatus comprising a portable body, a pan adapted to traverse the surface upon which the portable body rides, means for hitching the pan to the body, incinerating means within the pan, a cross member pivotally connected to said portable body, said cross member extending throughout the operating width of said exterminating apparatus and carrying means for adjusting the height of said cross member which provides a plant agitating means.

5. An insect exterminating apparatus comprising a portable body, a pan adapted to traverse the surface upon which the portable body rides, means for hitching the pan to the body, incinerating means within the pan, pneumatic plant agitating means carried by the body, said pneumatic agitating means being adapted to direct a stream of air in a downward direction toward said pan, and a cross member pivotally connected to said portable body, said cross member extending throughout the operating width of said exterminating apparatus and providing additional plant agitating means.

6. An apparatus of the class described, a pan adapted to traverse along a plant row, a supplemental bottom within the pan, means within the pan below the bottom for heating the same, and aprons carried by the upper side marginal portions of the pan and disposed inwardly and downwardly thereof, one of said aprons terminating inwardly of and above the other.

In testimony whereof I hereunto affix my signature.

ROBERT E. HAMMOCK.